United States Patent
Moore et al.

(10) Patent No.: US 10,127,560 B2
(45) Date of Patent: *Nov. 13, 2018

(54) METHODS AND SYSTEMS FOR FACILITATING CUSTOMER SUPPORT USING A SOCIAL POST CASE FEED AND PUBLISHER

(71) Applicant: salesforce.com, inc., San Francisco, CA (US)

(72) Inventors: Eric Moore, San Francisco, CA (US); Sutthipong Thavisomboon, San Francisco, CA (US); Yuseung Kim, San Francisco, CA (US); Bryan Hart, Halifax (CA); Jaroslaw Kozieronek, Halifax (CA)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/883,881

(22) Filed: Jan. 30, 2018

(65) Prior Publication Data

US 2018/0158070 A1    Jun. 7, 2018

Related U.S. Application Data

(63) Continuation of application No. 14/451,632, filed on Aug. 5, 2014, now Pat. No. 9,972,015.
(Continued)

(51) Int. Cl.
*G06F 15/16* (2006.01)
*G06Q 30/00* (2012.01)
(Continued)

(52) U.S. Cl.
CPC .......... *G06Q 30/016* (2013.01); *G06Q 50/01* (2013.01); *H04L 51/32* (2013.01); *H04W 4/21* (2018.02)

(58) Field of Classification Search
CPC ....... G06Q 30/016; G06Q 50/01; H04W 4/21; H04L 51/32
(Continued)

(56) References Cited

U.S. PATENT DOCUMENTS 5,577,188 A   11/1996 Zhu
5,608,872 A   3/1997 Schwartz et al.
(Continued)

OTHER PUBLICATIONS

Final Office Action for U.S. Appl. No. 12/437,418, dated Apr. 16, 2012.
(Continued)

*Primary Examiner* — S M Rahman
(74) *Attorney, Agent, or Firm* — Lorenz & Kopf, LLP (57) ABSTRACT

Methods and systems are provided for responding to customer posts on a plurality of social media channels from a customer service portal of a Customer Relationship Management (CRM) system of an organization. A retrieval system can retrieve, based on one or more rules specified by a rules engine, data from a first customer post on a first social media channel. The first customer post is identified using one or more rules that finds customer posts that warrant a customer service response from the organization. Based on the data from the first customer post, a parser of the CRM system creates a first case that can be displayed at the customer service portal, which automatically pre-populates a first response to the first customer post in compliance with protocols associated with the first social media channel that allow the first response to be communicated via the first social media channel.

16 Claims, 6 Drawing Sheets

Related U.S. Application Data (60) Provisional application No. 61/877,701, filed on Sep. 13, 2013, provisional application No. 61/877,715, filed on Sep. 13, 2013, provisional application No. 61/877,722, filed on Sep. 13, 2013.

(51) Int. Cl.
  *G06Q 50/00* (2012.01)
  *H04L 12/58* (2006.01)
  *H04W 4/21* (2018.01)

(58) Field of Classification Search
  USPC .................................................. 709/206
  See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,856,445 B2 | 12/2010 | Gross |
| 7,945,653 B2 | 5/2011 | Zuckerberg et al. |
| 7,991,764 B2 | 8/2011 | Rathod |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,166,013 B2 | 4/2012 | Bandaru et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,009,256 B1 * | 4/2015 | DeMorrow .......... H04L 67/02 709/203 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |

(56) References Cited

U.S. PATENT DOCUMENTS

| | | |
|---|---|---|
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0010270 A1 | 1/2008 | Gross |
| 2008/0147487 A1 | 6/2008 | Hirshberg |
| 2008/0209320 A1 | 8/2008 | Mawhinney et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0125502 A1 | 5/2010 | Solomon et al. |
| 2010/0217757 A1 | 8/2010 | Fujioka |
| 2010/0241576 A1 | 9/2010 | Beeri |
| 2011/0209067 A1 | 8/2011 | Bogess et al. |
| 2011/0258204 A1 | 10/2011 | Hubbard et al. |
| 2012/0233137 A1 | 9/2012 | Jakobson et al. |
| 2012/0290407 A1 | 11/2012 | Hubbard et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0164530 A1* | 6/2014 | Stoertenbecker ....... H04L 51/32 709/206 |
| 2014/0237057 A1* | 8/2014 | Khodorenko ........... H04L 51/32 709/206 |

OTHER PUBLICATIONS

Final Office Action for U.S. Appl. No. 12/356,429, dated May 2, 2012.

Notice of Allowance for U.S. Appl. No. 12/819,402, dated May 14, 2012.

Non-Final Office Action for U.S. Appl. No. 13/453,802, dated Jun. 8, 2012.

Linear Combination-Wikipedia (http://en.wikipedia.org/wiki/Linear_Combination (accessed Jul. 16, 2012).

\* cited by examiner

METHODS AND SYSTEMS FOR FACILITATING CUSTOMER SUPPORT USING A SOCIAL POST CASE FEED AND PUBLISHER

CROSS-REFERENCE TO RELATED APPLICATION

This application is a continuation of U.S. application Ser. No. 14/451,632 filed Aug. 5, 2014. That application claims the benefit of U.S. provisional patent application Ser. Nos. 61/877,701, 61/877,715, and 61/877,722 filed Sep. 13, 2013, the entire content of which are incorporated by reference herein.

TECHNICAL FIELD

Embodiments of the subject matter described herein relate generally to customer service platforms and, more particularly, to computer systems and applications for configuring and publishing social media posts in a case feed.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

Robust Customer Relationship Management (CRM) systems and applications have been developed for use both within and outside the multi-tenant environment. In addition, automated systems for gathering social media content from the internet, such as the Radian6™ system available at www.salesforce.com, have been developed to assist customer service agents in locating and responding to customer queries. At the same time, consumers are increasingly interacting with brand agents using on-line social networking sites such as Facebook™, Pinterest™, Tumblr™, Google+™ Hootsuite™ and Twitter™. Presently known CRM applications, however, are not equipped to allow agents to communicate with consumers through on-line social networking sites.

Systems and methods are thus needed for integrating a customer service platform with social media channels to facilitate communication between customer service agents and consumers.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to integrating social media posts retrieved from the web into a customer service management (CRM) environment to facilitate interaction between a brand agent and a consumer, regardless of which social media channel the consumer chooses to engage for support (e.g., Twitter, Facebook, and the like). The integration generally involves four components:

i) an application programming interface (API) for receiving social post data from a web-based retrieval module;

ii) a parser for configuring the received data into custom objects and presenting a customer service case (ticket) to a brand agent in a CRM portal;

iii) a social publisher for facilitating seamless interaction between the CRM platform and various social media channels (e.g., Twitter, Facebook); and ii) a case feed embedded within the CRM case page for tracking and displaying communication threads between the agent and the consumer.

Figure 1:
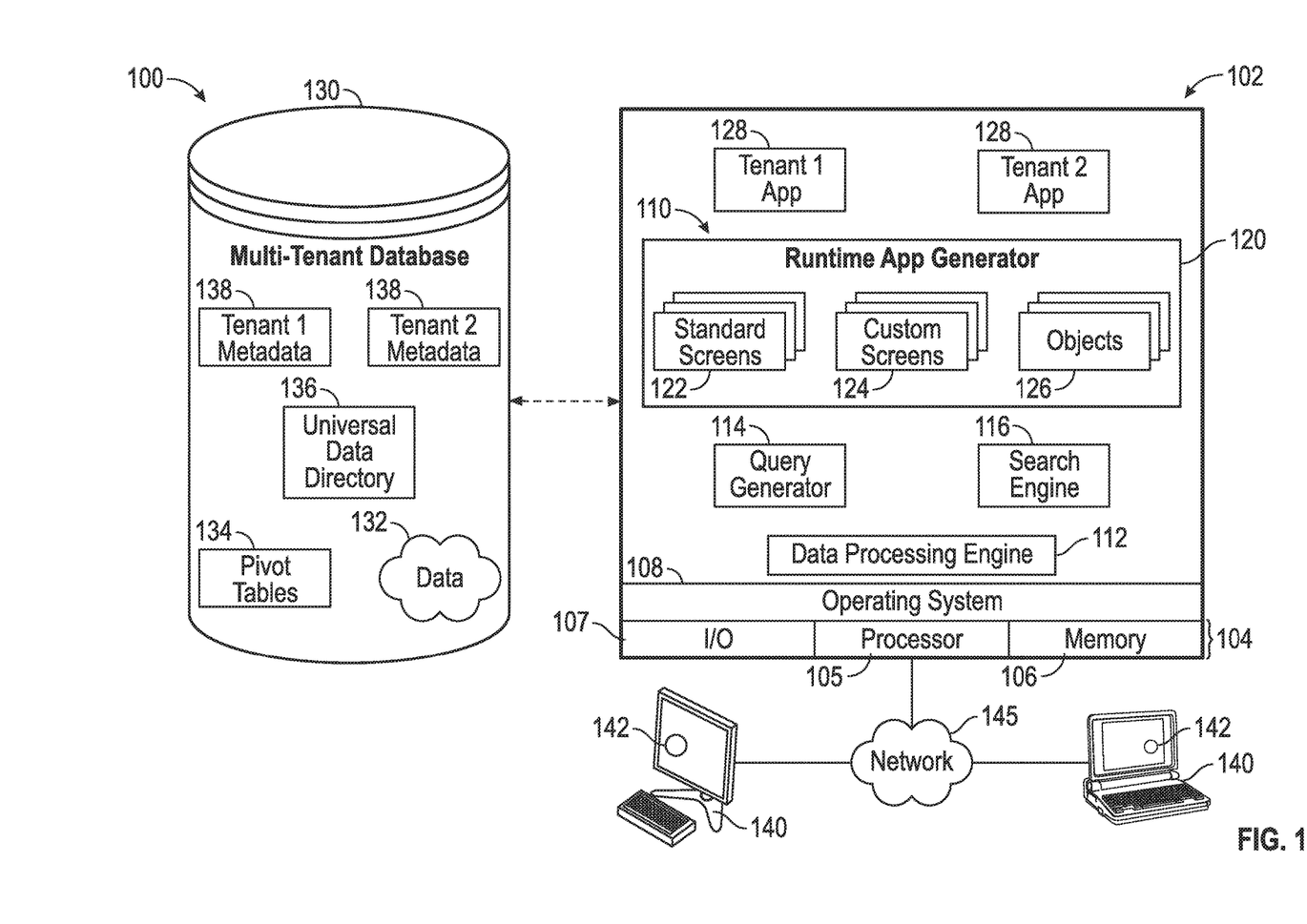
FIG. 1 is a schematic block diagram of a multi-tenant computing environment in accordance with an exemplary embodiment.

Turning now to FIG. 1, an exemplary multi-tenant system 100 includes a server 102 that dynamically creates and supports virtual applications 128 based upon data 132 from a database 130 that may be shared between multiple tenants, referred to herein as a multi-tenant database. Data and services generated by the virtual applications 128 are provided via a network 145 to any number of client devices 140, as desired. Each virtual application 128 is suitably generated at run-time (or on-demand) using a common application platform 110 that securely provides access to the data 132 in the database 130 for each of the various tenants subscribing to the multi-tenant system 100. In accordance with one non-limiting example, the multi-tenant system 100 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 130. In this regard, each tenant includes one or more users associated with, assigned to, or otherwise belonging to that respective tenant. Stated another way, each respective user within the multi-tenant system 100 is associated with, assigned to, or otherwise belongs to a particular one of the plurality of tenants supported by the multi-tenant system 100. Tenants may represent companies, corporate departments, business or legal organizations, and/or any other entities that maintain data for particular sets of users (such as their respective customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other tenants.

The multi-tenant database 130 may be a repository or other data storage system capable of storing and managing the data 132 associated with any number of tenants. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by a virtual application 128, as described in greater detail below. The multi-tenant database 130 may alternatively be referred to herein as an on-demand database, in that the multi-tenant database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate.

As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

Figure 2:
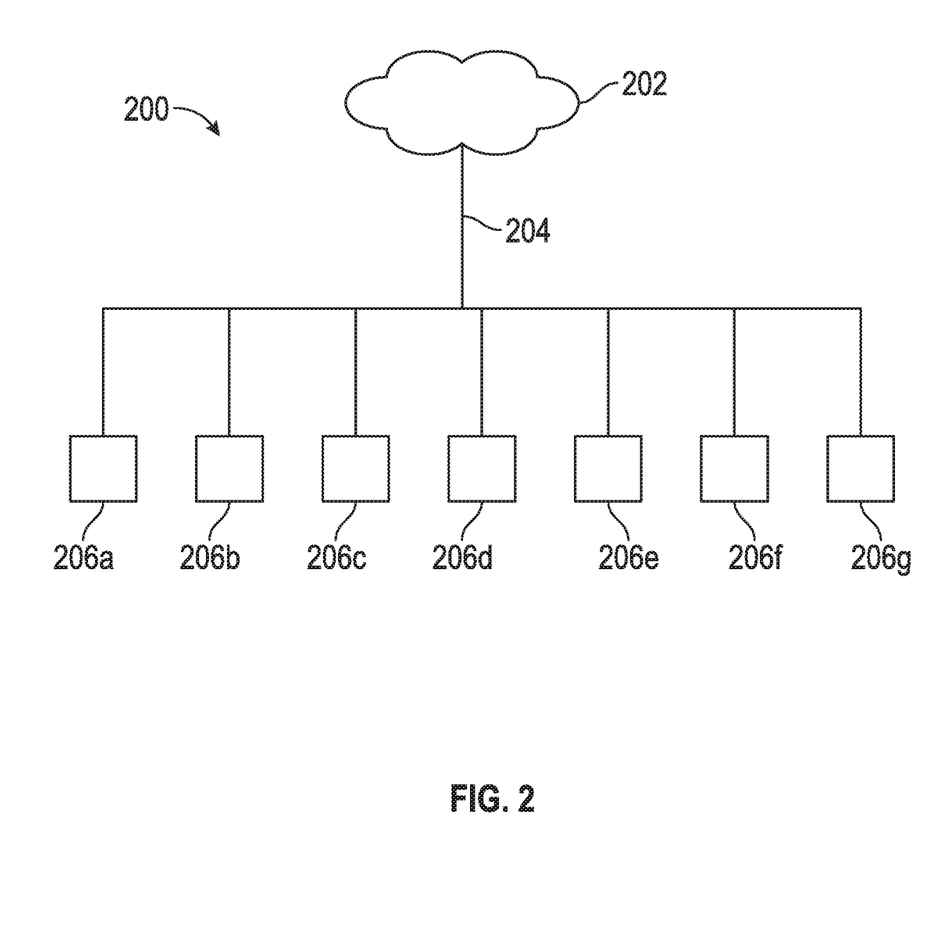
FIG. 2 is a schematic block diagram of an internet bot configured to retrieve social media content from a plurality of website channels in accordance with an exemplary embodiment.

FIG. 2 is a schematic block diagram of an internet based data retrieval module configured to retrieve social media content from a plurality of website channels. More particularly, FIG. 2 illustrates a system 200 including a computing cloud 202 configured to retrieve metrics from a plurality of websites 206 in accordance with an exemplary embodiment. Cloud 202 may be of the type described above in conjunction with FIG. 1, and may be configured to access any number of websites 206(a)-206(g) over an Internet connection 204. Websites 206 may be any type of site from which data is monitored, retrieved, or collected. Exemplary sites may include news sites, blog sites, social media, and entertainment venues such as, for example, Facebook™, Pinterest™, Tumblr™, Google+™, Hootsuite™, Twitter™, and You Tube™.

Multi-site data retrieval modules, such as Radian6™, gather social media posts from the internet based on a configurable rules engine (e.g., Social Hub™ also available from www.salesforce.com). For example, an organization such as KLM airlines may configure its rules engine to instruct Radian6 to retrieve all "KLM" posts based on hash tags, @mentions, keywords, or any desired combination of metrics. In the case of Radian6, the social post data may be sent to the CRM platform in the form of a Java script object notation (JSON) string, a well-known plain-text format for data storage whose grammar is a subset of the JavaScript expressions. Each JSON string comprises plurality of data fields, for example:

```
{
    "first": "Jane",
    "last": "Porter",
    "married": true,
    "born": 1890,
    "friends": [ "Tarzan", "Cheeta" ]
}
```

As described in greater detail below in conjunction with FIG. 3, the CRM platform includes an API for receiving ("ingesting") the JSON string from the social post retrieval system. A parsing module (e.g., in the form of an APEX class code snippet) associated with the CRM system then configures one or more of the fields within the JSON string into objects for use by an agent in a social post case feed.

Figure 3:
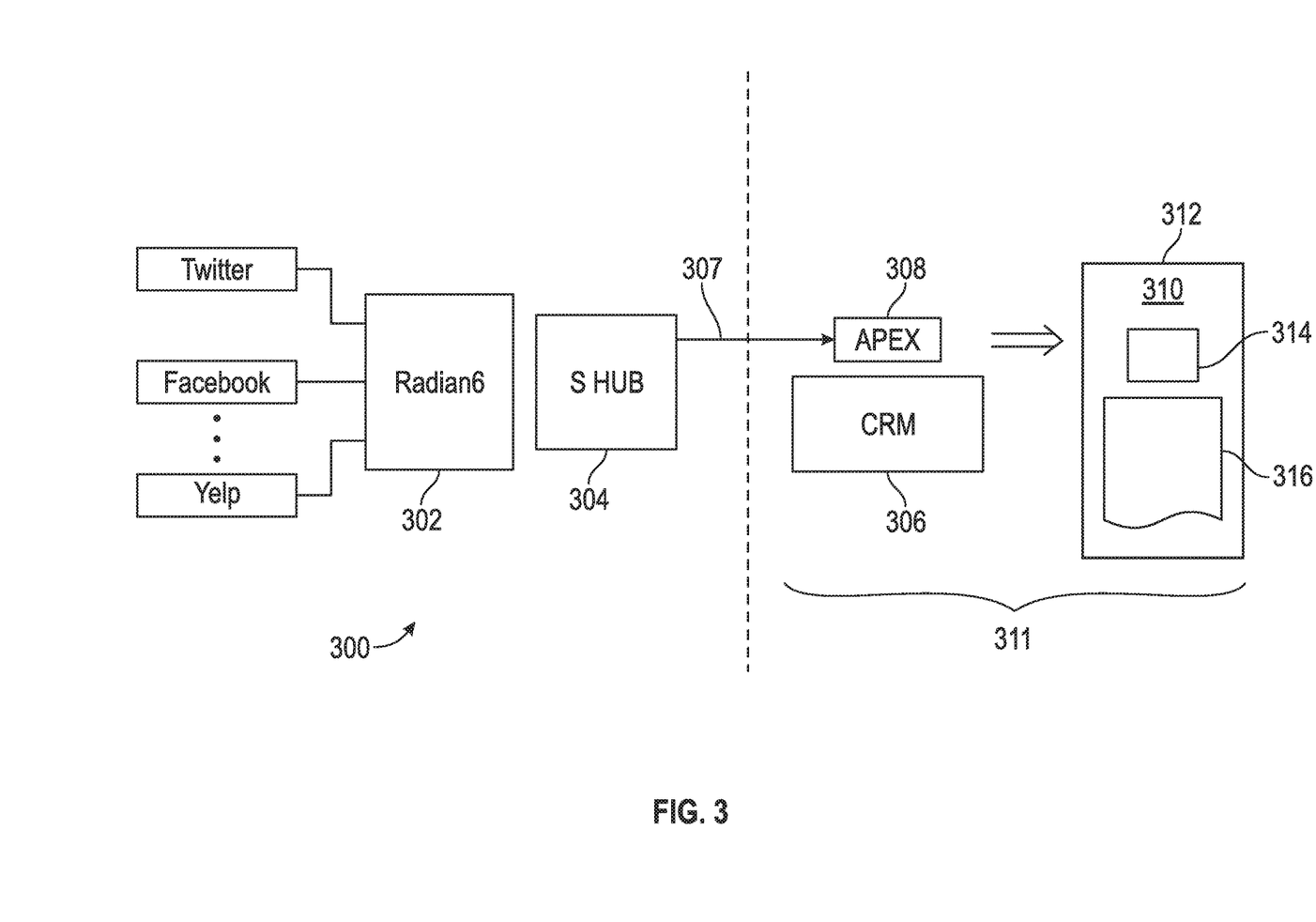
FIG. 3 is a schematic block diagram of a customer support system including a social media content database, a social hub rules engine, a customer relationship management platform including parser, and a customer service portal in accordance with an exemplary embodiment.

Referring now to FIG. 3, a schematic block diagram of a system 300 for ingesting, customizing, and processing social data includes a social media content database 302, a rules engine 304, and a customer relationship management platform 311. The CRM platform 311 includes a parser 308, a CRM database 306, and a customer service portal 312. More particularly, the rules engine 304 cooperates with a social post retrieval module or database 302 (e.g., Radian6) and allows an organization's marketing or support group (e.g., KLM) to configure its business rules to find relevant posts, including posts from consumers desiring to interact with a KLM customer service agent.

The parser module 308 may comprise APEX™ class code configured to parse the JSON string into objects, and to create a customer service case (ticket) from the objects and present the case for processing by an agent. In an embodiment, the parser 310 creates at least the following two objects from the JSON string: i) a social post; and ii) a social persona. More particularly, the social post object corresponds to the posted message, for example "I lost my luggage." The social persona object corresponds to the author of the post; if the author is not already represented in the CRM contact database, a new contact may be created for the author. Consequently, when a subsequent post is arrives, the CRM system can assign it to an existing case, as appropriate. In addition, by using information obtained from the contact profile, the case may be given appropriate (e.g., priority) treatment. In this way, it can be said that the social hub "pushes" these two objects (social persona and social post) to the on-demand database service.

With continued reference to FIG. 3, once a case is created, the CRM system (e.g., the parser 308) presents the case to a customer support agent via the CRM portal 312. In the illustrated embodiment, the CRM portal 312 comprises a case page 310 (displayed, for example, on a computer monitor or display screen) which includes at least a social publisher module 314 and a case feed 316, as described in greater detail below in connection with FIG. 4.

Figure 4:
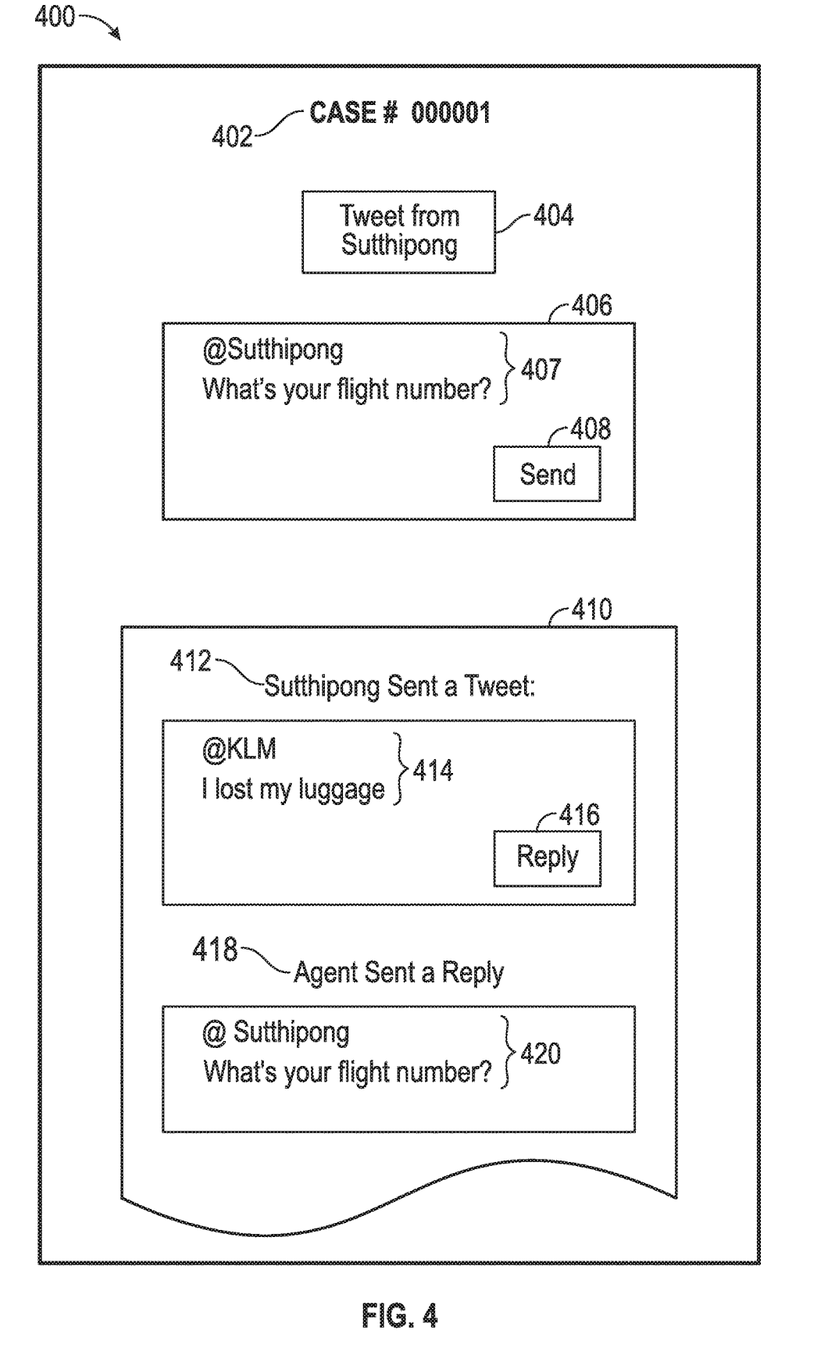
FIG. 4 is a schematic screen shot illustrating a case page including social publisher and a case feed in accordance with an exemplary embodiment.

Referring now to FIG. 4, a schematic block diagram of a screen shot shows a case page 400 including a case identifier field 402, a social post identifier field 404, a social publisher 406, and a case feed 410. In the illustrated embodiment, the social post identifier field 404 indicates the author of the incoming (the social persona, Sutthipong) as well as the source, type, channel, or nature of the incoming post (for example, a tweet from Twitter).

The social publisher 406 is configured to allow the agent to respond to consumer inquiries by publishing replies to various social channels (e.g., Facebook, Twitter) from a single CRM portal, as explained in greater detail below.

The case feed 410 may be configured as a scrolling list or "feed" of communication threads (posts) between the agent and one or more consumers. In the illustrated example, the case feed 410 includes an inbound identifier 412 (e.g., "Sutthipong Sent a Tweet"), corresponding to the post 414 "I Lost My Luggage" which @mentions KLM. The case feed 410 also includes an outbound identifier 418 (e.g., "Agent Sent a Reply"), corresponding to the post 420 "What's Your Flight Number", which @mentions Sutthipong; that is, when using Twitter, for example, one may direct a message to a known recipient by appending the recipient's user name to the symbol "@".

Figure 5:
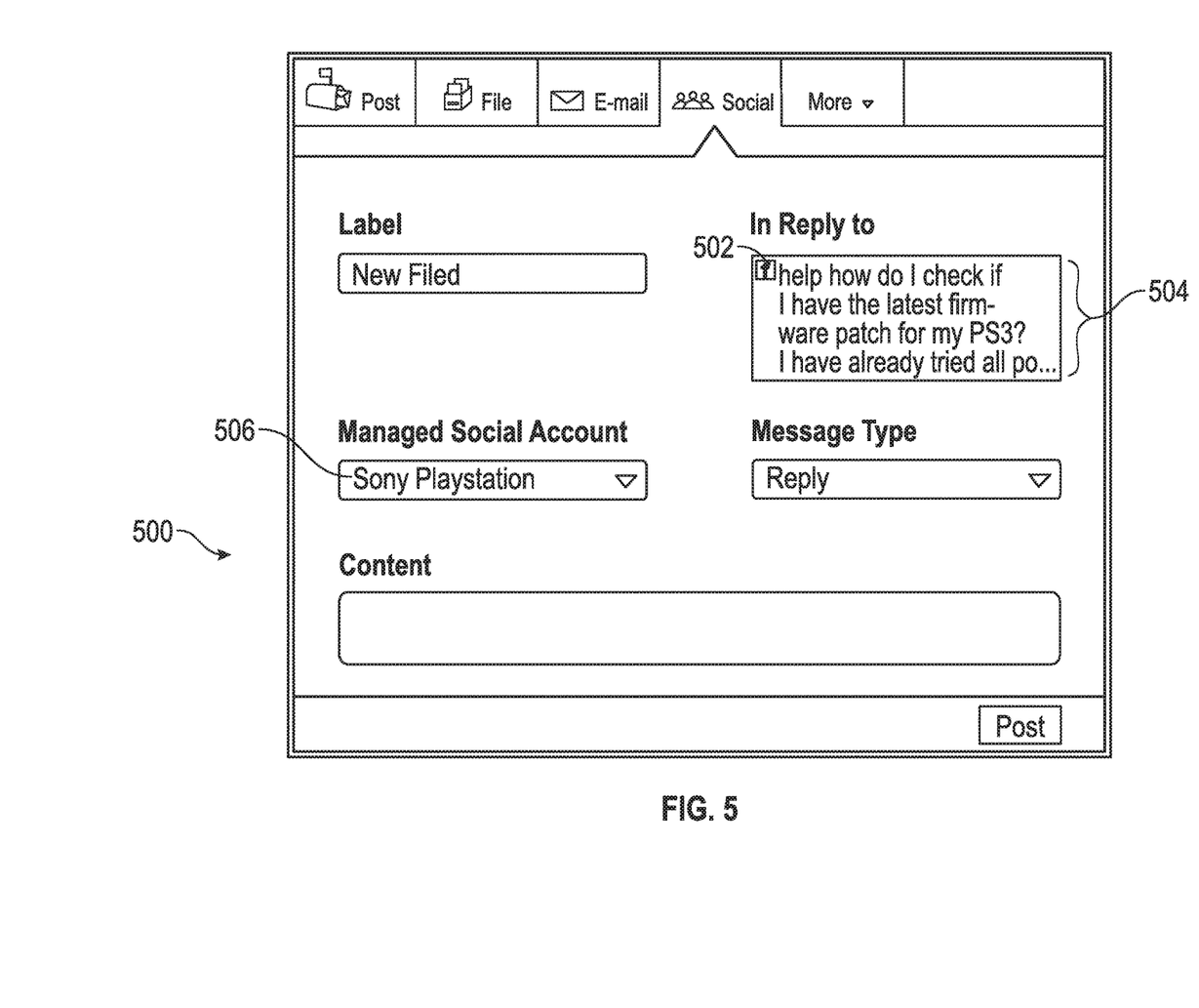
FIG. 5 is a screen shot illustrating a more detailed view the case feed of FIG. 4 in accordance with an exemplary embodiment.

FIG. 5 is a screen shot of a case feed item in the context of an exemplary social publisher, shown auto-populated with data based on the parsed inbound post. More particularly, the parser 308 parses the inbound message into individual components, and automatically populates these fields into a monitor viewed by a customer service representative to assist in responding to the customer inquiry. In the illustrated embodiment, the following fields may be populated from the inbound message: i) the social channel 502 (e.g., Twitter); ii) the message text 504; and iii) the identity of the managed social account 506.

With continued reference to FIGS. 3 and 4 and also referring now to FIG. 6, a flow diagram of an exemplary use case will now be described.

A method 600 for integrating posts retrieved from social media channels into a CRM platform typically begins with a consumer reaching out for customer service and/or support, such as a passenger sending a tweet (@mentioning KLM) "I Lost My Luggage" (Task 602). The consumer post may then be retrieved by the social hub 304, which sends a JSON string 307 (See FIG. 3) to the CRM platform 311 (Task 604). The method 600 further includes the parser 310 parsing the JSON into objects, such as a social post and a social persona (as well as additional custom objects, as desired), and saved the objects to that organization's (e.g., KLM) CRM database within the multi-tenant environment (Task 606).

Figure 6:
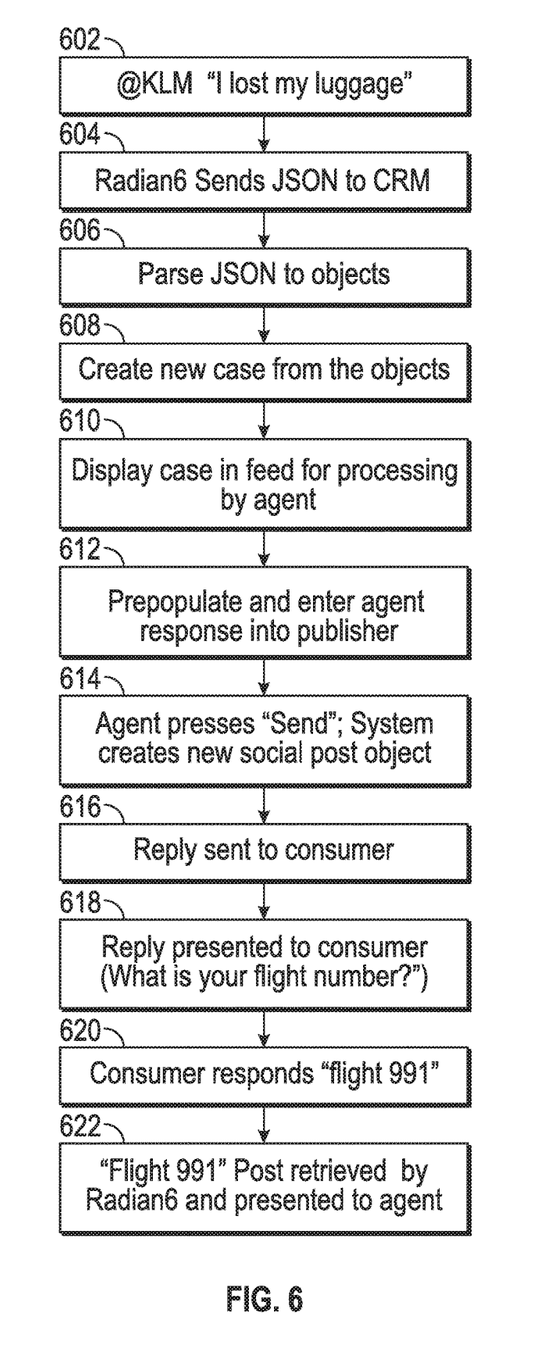
FIG. 6 is a flow chart illustrating a method of integrating social media posts into a customer support case page in accordance with exemplary embodiments.

With continued reference to FIGS. 3, 4, and 6, the method 600 further involves creating a new case (or updating an existing one) based on the objects, and storing the case in the organization's CRM database (Task 608). The new case may then be presented to an agent in the case page 400 (e.g., message 414) (Task 610). The agent may then process the case (Task 612), for example, by formulating an appropriate response, taking corrective action, or the like. Typically, this involves pressing the "Reply" button 416, which opens up the social publisher 4006, allowing the agent to type in (or otherwise enter) a reply into the publisher, such as "What is Your Flight Number?". In an embodiment, the APEX class 310 may also be configured to prepopulate the publisher with the consumer's handle (e.g., @Sutthipong), an appropriate hash tag, or other metrics appropriate for the particular social channel through which the agent desires to respond.

When the response is complete, the agent may press the "Send" virtual button 408 to thereby create and save a new social post object, namely, the reply @Sutthipong "What is Your Flight Number" (Task 614). The Reply may then be sent to the consumer (Task 616). In an embodiment, Task 616 may involve the APEX class 310 calling an API associated with the Radian6 module and/or the social hub module 304 to thereby send the reply to the consumer via the designated channel (e.g., Twitter). The consumer (in the present example, Sutthipong) then views (Task 618) the agent's Reply on the same channel through which the initial query was sent, for example, via Twitter.

Upon viewing the agent's reply, the consumer may respond via Twitter with a new social post such as: @mention KLM "Flight #991" (Task 620). The consumer's response is picked up by the Radian6 module and presented to the agent (Task 622) as discussed above, whereupon the process essentially repeats steps 602-610. That is, the new post "Flight #991" is passed to the CRM platform as a JSON string, parsed, and presented to the agent as either a new case or appended to an existing case thread in the case feed, as appropriate.

Each of the various functional modules and/or steps shown in FIGS. 2-6 may comprise computer code embodied in a non-transitory form in a computer readable medium.

Methods and systems are thus provided for integrating social media channels into a customer service management (CRM) portal. The method involves: receiving data for a consumer post; parsing the data into at least two objects; creating a case from the at least two objects; and displaying the case in the CRM portal.

In an embodiment, receiving data for the consumer post comprises receiving the data in the form of a Java script object notation (JSON) string, and parsing the data into at least two objects comprises parsing the data into a social post object and a social persona object.

In an embodiment, the CRM portal comprises a social publisher and a social case feed, and displaying the case in the CRM portal comprises displaying indicia of the social post object and the social persona object in the social case feed.

In an embodiment, the method may also involve: prompting an agent to compose a reply to the social post; pre-populating the social publisher with information obtained from the social post object and the social persona object; creating, by the agent using the CRM portal, a reply social post; and transmitting, from the CRM portal, the reply social post to the consumer.

In an embodiment, receiving data for a consumer post comprises receiving the data from a social media channel such as Twitter or Facebook, and transmitting comprises transmitting the reply social post using the same channel from which the consumer post data was received.

In an embodiment, parsing the JSON string comprises parsing using an APEX class parser.

The method may also involve prompting the agent, using the social publisher, to select Facebook, Twitter, or another social media channel as the transmission channel, and using the APEX class to direct the reply social post to the selected channel.

In an embodiment, receiving data for a consumer post comprises receiving the data from an internet bot having a configurable rules engine.

A customer service portal is also provided for communicating with at least one social media channel. The portal may include: an interface configured to receive a social post retrieved from the at least one social media channel, and to parse the social post into at least one object; a database for storing the at least one object; and a display module including a case feed configured to present indicia of the at least one object to a customer service agent, and a publisher configured to allow the agent to respond to the social post via the at least one social media channel.

In an embodiment, the at least one social media channel may be one of Twitter, Facebook or another social media channel.

In an embodiment, the interface is configured to receive the social post in the form of a JSON string from an internet bot having a user configurable rules engine, and the interface is configured to parse the social post into at least a social post object and a social persona object.

In an embodiment, the display module is configured to display indicia of the social post object and the social persona object in the social case feed.

The system may also include a processing system configured to: prompt the agent to compose a reply to the social post using the publisher; pre-populate the publisher with information obtained from the social post object and the social persona object; prompt the agent to select a channel from among the at least one social media channels; and transmit, from the customer service portal, the reply social post via the selected social media channel.

Computer code embodied in a non-transitory computer readable medium for execution by a processor is also provided for performing the steps of: receiving data for a consumer post from a social media channel; parsing the data into at least two objects; creating a case from the at least two objects; displaying the case for processing by an agent in a customer service portal; prompting the agent to compose a reply to the consumer post; pre-populating a social publisher with information obtained from the at least two objects; creating, by the agent using the customer service portal, a reply social post; and transmitting, from the customer service portal, the reply social post to a consumer via the social media channel The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of responding, from a customer service portal of a Customer Relationship Management (CRM) system of an organization, to customer posts on a plurality of social media channels, the method comprising:
   retrieving, via a retrieval system based on one or more rules specified by a rules engine, data from a first customer post on a first social media channel, wherein the data is in the form of a Java script object notation (JSON) string comprising data fields, wherein the first customer post is identified by the retrieval system using one or more rules that finds customer posts that warrant a customer service response from the organization;
   receiving, the data from the first customer post by ingesting the JSON string via an application programming interface (API) of the CRM system;
   parsing, at a parser of the CRM system, the data fields of the JSON string into at least two objects comprising: a social post object that corresponds to a posted message of the first customer post and a social persona object that corresponds to an author of the first customer post;
   creating, via the CRM system, a first case based on the at least two objects;
   causing the first case to be displayed at the customer service portal; and
   automatically pre-populating, by the customer service portal, a first response to the first customer post in compliance with protocols associated with the first social media channel that allow the first response to be communicated via the first social media channel.

2. The method of claim 1, further comprising:
   retrieving, via the retrieval system, data from a second customer post on a second social media channel, wherein the second customer post is identified by the retrieval system using one or more rules that finds customer posts that warrant a customer service response from the organization, wherein the second social media channel is different from the first social media channel;
   receiving, at the interface of the CRM system, the data from the second customer post;
   creating, via the CRM system, a second case based on the data from the second customer post;
   causing the second case to be displayed at the customer service portal; and
   automatically pre-populating, by the customer service portal, a second response to the second customer post in compliance with protocols associated with the second social media channel that allows the second response to be communicated via the second social media channel.

3. The method of claim 1, wherein retrieving, via the retrieval system, data from the first customer post on the first social media channel comprises:
   retrieving, via a multi-site retrieval system based on the one or more rules specified by the rules engine, the data from the first customer post on the first social media channel,
   wherein the one or more rules used by the rules engine are configurable by the organization using the CRM system to find customer posts that warrant creation of customer service responses from the organization, and wherein the customer posts that warrant creation of the customer service responses are a subset of all posts on the first social media channel relating to the organization.

4. The method of claim 1, wherein the customer service portal further comprises: a social publisher and a social case feed, and wherein causing the first case to be displayed at the customer service portal comprises:
   displaying, via the social publisher, information obtained from the social post object and the social persona object in the social case feed at the customer service portal.

5. The method of claim 4, further comprising:
   displaying, via the social publisher, a prompt to compose a reply to the first customer post to be included with the first response in compliance with the protocols associated with the first social media channel.

6. The method of claim 4, further comprising:
   pre-populating, via the social publisher, the reply based on information obtained from the social post object.

7. The method of claim 4, further comprising:
   pre-populating, via the social publisher, the reply based on information obtained from the social persona object.

8. The method of claim 1, wherein automatically pre-pre-populating, comprises:
   automatically determining, by the customer service portal, a particular account of the first social media channel that is associated with the author of the first post from the social persona object; and
   automatically pre-populating, by the customer service portal, the first response to the first customer post to be directed toward the particular account associated with the author of the first post.

9. The method of claim 2, further comprising:
   retrieving, via the retrieval system, data from a third customer post on a third social media channel, wherein the third customer post is identified by the retrieval system using one or more rules that finds customer posts that warrant a customer service response from the organization, wherein the third social media channel is different from the first social media channel and the second social media channel;

receiving, at the interface of the CRM system, the data from the third customer post;

creating, via the parser of the CRM system, a third case based on the data from the third customer post;

causing the third case to be displayed at the customer service portal; and automatically pre-populating, by the customer service portal, a third response to the third customer post in compliance with protocols associated with the third social media channel that allow the third response to be communicated via the third social media channel, wherein the protocols associated with the third social media channel are different from the protocols associated with the first social media channel and the protocols associated with the second social media channel.

10. A system for responding to customer posts on a plurality of social media channels, the system comprising:
  a retrieval system configured to: retrieve data from a first customer post on a first social media channel, wherein the first customer post is identified by the retrieval system using one or more rules that finds customer posts that warrant a customer service response from the organization;
  a Customer Relationship Management (CRM) system of an organization, comprising:
    an application programming interface (API) that is configured to receive, from the retrieval system, the data from the first customer post in the form of a Java script object notation (JSON) string comprising data fields;
    a parser configured to parse the data fields of the JSON string into: a social post object that corresponds to a posted message of the first customer post and a social persona object that corresponds to an author of the first customer post; and
    a customer service portal, comprising:
      a display configured to display the social post object and the social persona object; and
      a processing system configured to execute code that, when executed by the processing system, is configured to: automatically pre-populate a first response to the first customer post in compliance with protocols associated with the first social media channel to allow the first response to be communicated via the first social media channel.

11. The system for claim 10, wherein the retrieval system is further configured to:
  retrieve data from a second customer post on a second social media channel that is different from the first social media channel, wherein the second customer post is identified by the retrieval system using one or more rules that finds customer posts that warrant another customer service response from the organization; and
  wherein the interface is further configured to receive the data from the second customer post;
  wherein the parser is further configured to create a second case based on the data from the second customer post; and
  wherein the display is further configured to display the second case; and
  wherein the processing system is further configured to execute code that, when executed by the processing system, is configured to:
    automatically pre-populate: a second response to the second customer post in compliance with protocols associated with the second social media channel that allow the second response to be communicated via the second social media channel, wherein the protocols associated with the second social media channel are different from the protocols associated with the first social media channel.

12. The system for claim 10, wherein the retrieval system comprises a rules engine, and wherein the retrieval system is a multi-site retrieval system configured to retrieve the data from the first customer post on the first social media channel based on one or more rules specified by the rules engine, wherein the one or more rules used by the rules engine are configurable by the organization using the CRM system to find customer posts that warrant creation of customer service responses from the organization, and wherein the customer posts that warrant creation of the customer service responses are a subset of all posts on the first social media channel relating to the organization.

13. The system for claim 10, wherein the customer service portal further comprises:
  a social case feed that is configured to: display information obtained from the social post object and the social persona object.

14. The system for claim 10, wherein the code, when executed by the processing system, is further configured to:
  displaying a prompt to compose a reply to the first customer post to be included with the first response in compliance with the protocols associated with the first social media channel
  pre-populate the reply based on information obtained from the social post object and information obtained from the social persona object.

15. The system for claim 11, wherein the retrieval system is further configured to: retrieve data from a third customer post on a third social media channel, wherein the third customer post is identified by the retrieval system using one or more rules that finds customer posts that warrant another customer service response from the organization, wherein the third social media channel is different from the first social media channel;
  wherein the interface is configured to receive the data from the third customer post, and wherein the parser is configured to create a third case based on the data from the third customer post;
  wherein the code, when executed by the processing system, is further configured to:
    display the third case; and
    automatically pre-populate a third response to the third customer post in compliance with protocols associated with the third social media channel to allow the third response to be communicated via the third social media channel, wherein the protocols associated with the third social media channel are different from the protocols associated with the first social media channel and the protocols associated with the second social media channel.

16. A Customer Relationship Management (CRM) computing system of an organization, the CRM computing system comprising at least one processor and a memory, wherein the memory comprises computer-executable instructions that are capable of execution by the at least one processor, and that when executed by the at least one processor, cause the computing system to:
  receive, at an application programming interface (API) from a retrieval system, data retrieved from a first customer post on a first social media channel, wherein the data is in the form of a Java script object notation (JSON) string comprising data fields, wherein the first customer post is identified by the retrieval system using one or more rules that finds customer posts that warrant a customer service response from the organization;

parse the data fields of the JSON string into at least two objects comprising: a social post object that corresponds to a posted message of the first customer post and a social persona object that corresponds to an author of the first customer post;

create a first case based on the at least two objects;

cause the first case to be displayed at a customer service portal; and automatically pre-populate a first response to the first customer post in compliance with protocols associated with the first social media channel that allow the first response to be communicated via the first social media channel.

* * * * *